May 25, 1954
W. F. STREHLOW
2,679,199
POWER LIFT MEANS AFFORDING DEPTH REGULATION
OF TRACTOR PROPELLED IMPLEMENTS
Filed May 26, 1948
6 Sheets-Sheet 1
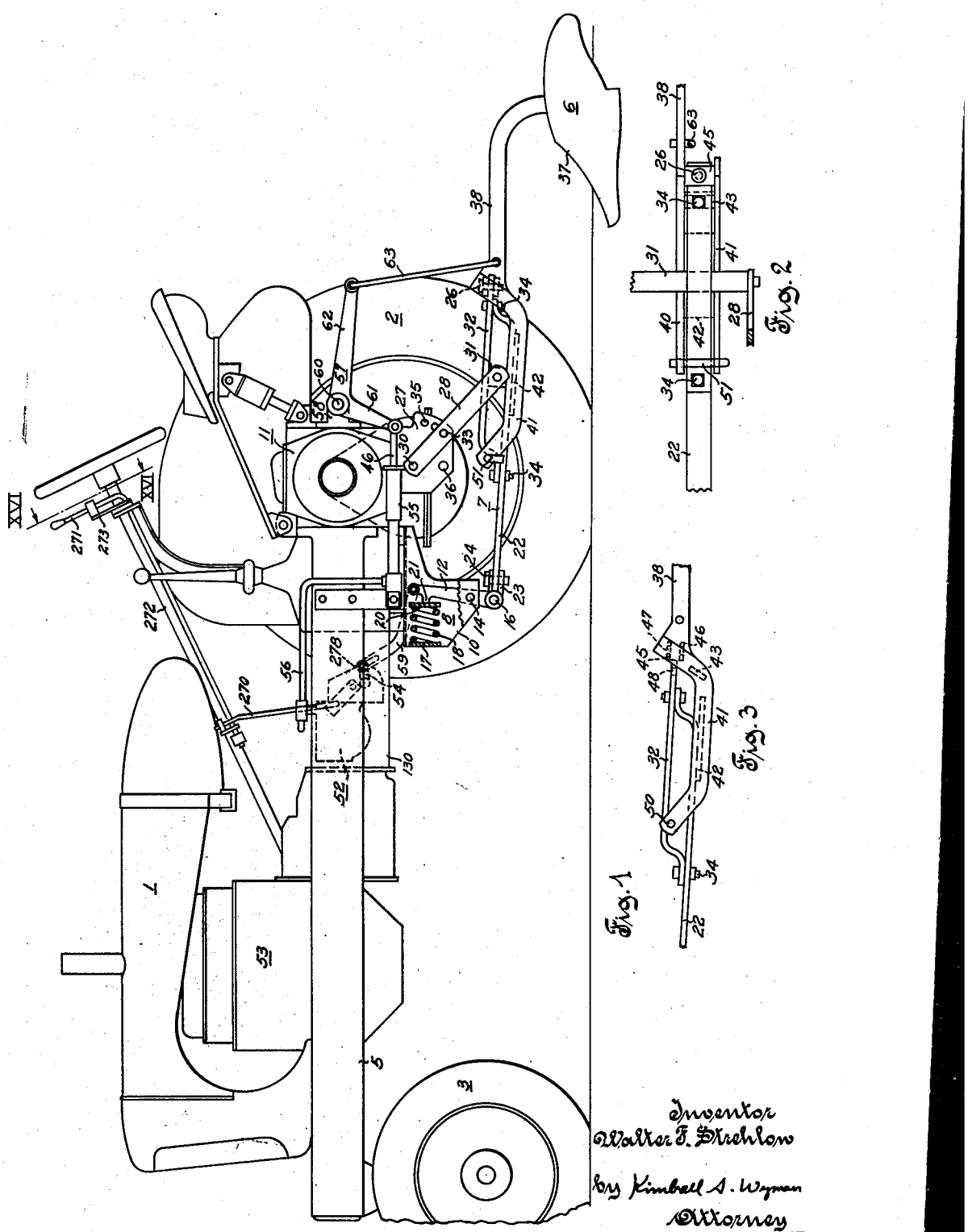
Inventor
Walter F. Strehlow
by Kimball A. Wyman
Attorney

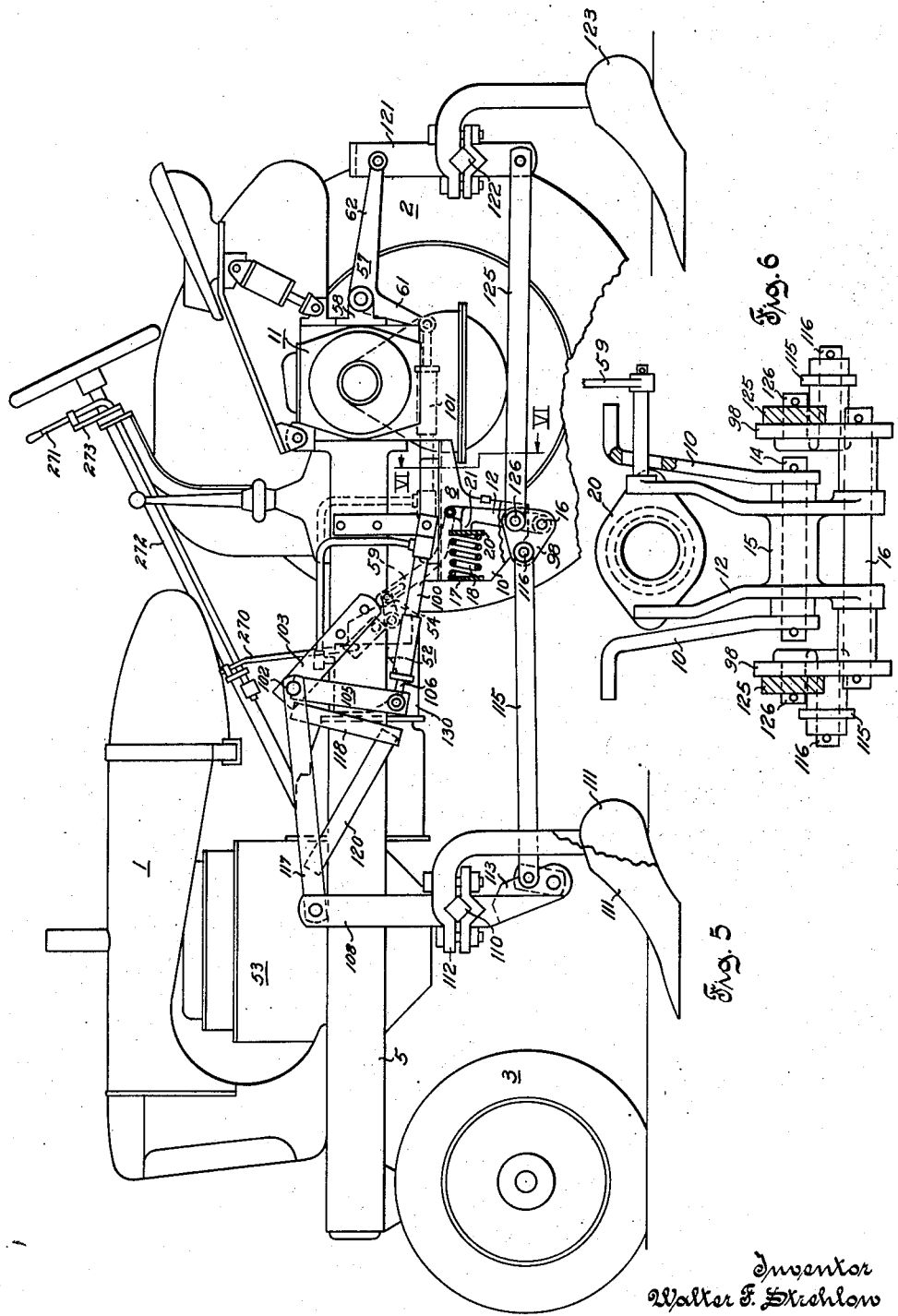

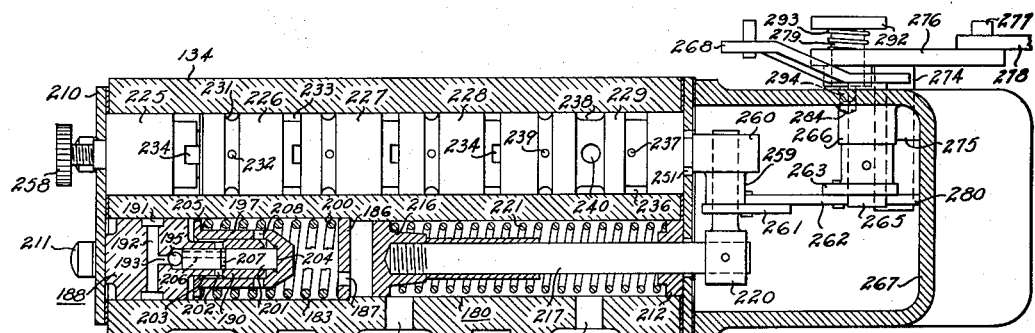
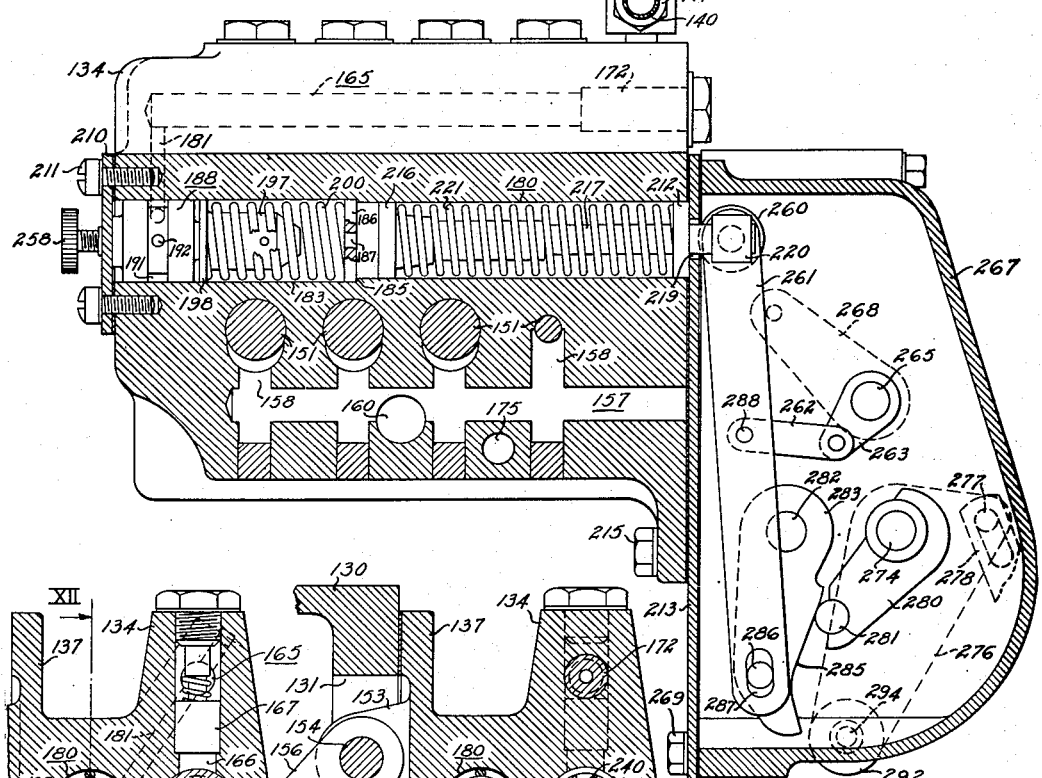
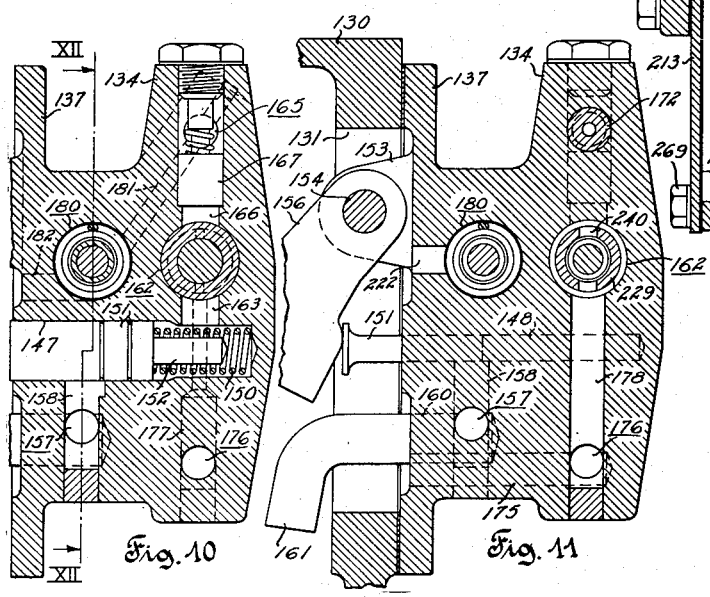

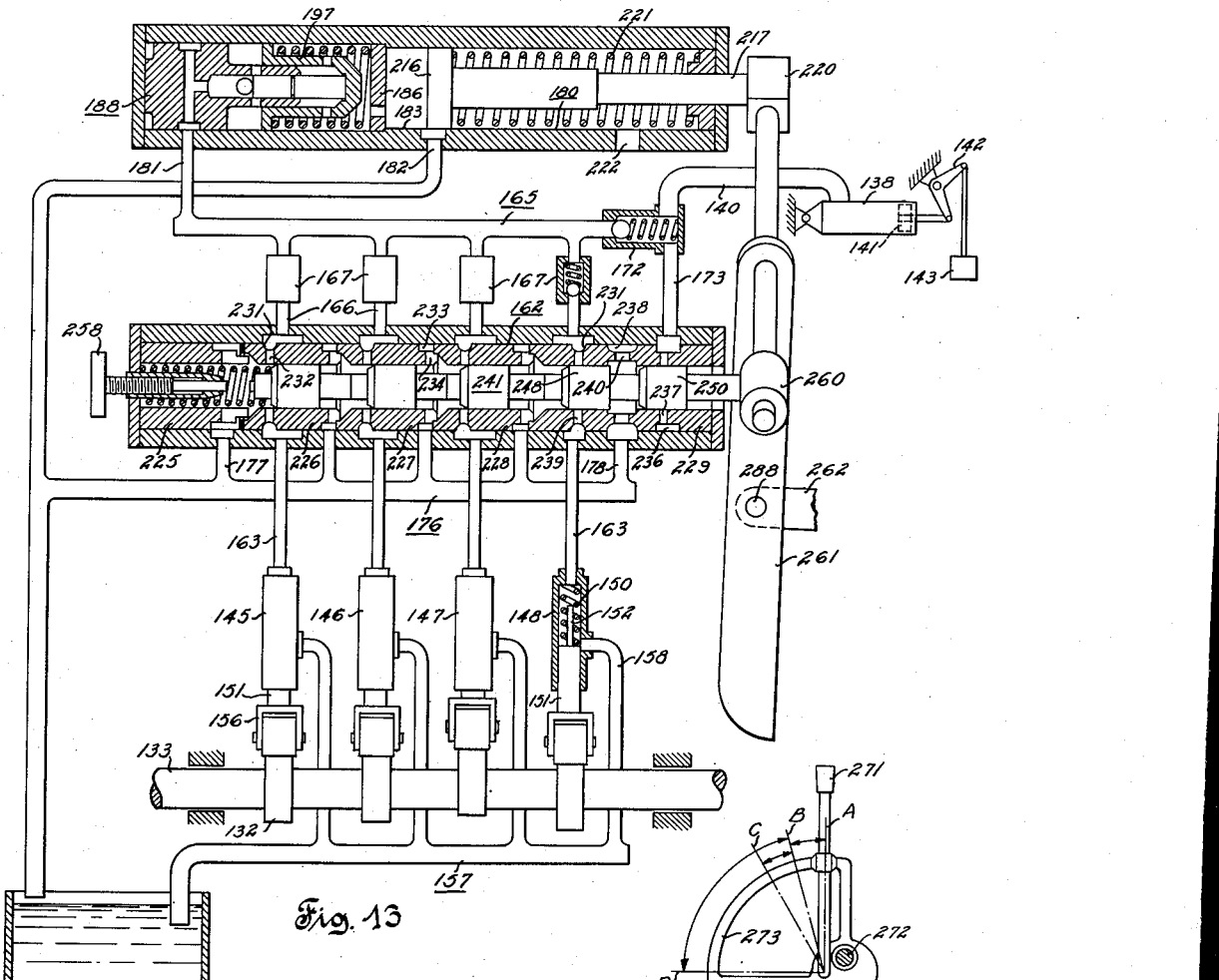
Fig. 13
Fig. 16
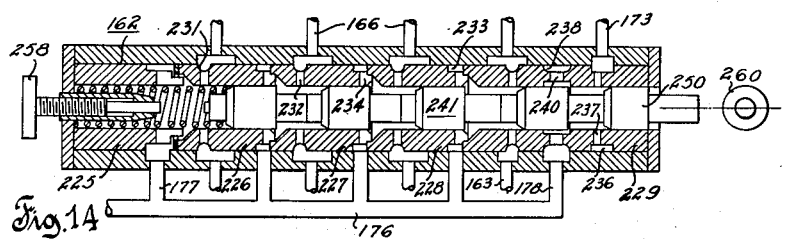
Fig. 14
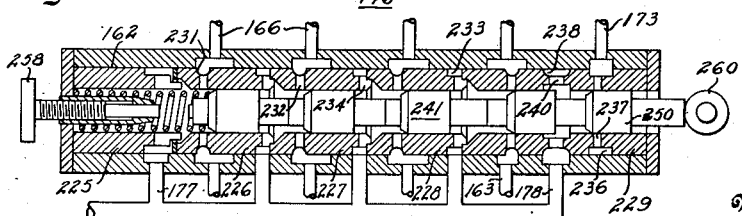
Fig. 15

Patented May 25, 1954

2,679,199

UNITED STATES PATENT OFFICE 2,679,199

POWER LIFT MEANS AFFORDING DEPTH REGULATION OF TRACTOR PROPELLED IMPLEMENTS

Walter F. Strehlow, Wauwatosa, Wis., assignor to Allis-Chalmers Manufacturing Company, Milwaukee, Wis., a corporation of Delaware Application May 26, 1948, Serial No. 29,234

12 Claims. (Cl. 97—46.07)

This invention relates generally to the control of implements propelled by any suitable self-powered vehicle, hereinafter termed a tractor, and is more particularly concerned with the provision of apparatus for selectively positioning and/or controlling one or more such implements, as desired, certain of the features hereinafter shown and described being disclosed and claimed in my copending application Ser. No. 27,928, filed May 19, 1948, now Patent No. 2,611,245.

In operating the various types of tractor attached implements, it is now common practice to employ a hydraulic system comprising a pump means driven by power derived from the tractor engine, a ram unit receiving pressure liquid from the pump means and operatively connected with the implement to raise or lower same, and a manually actuable valve means for controlling operation of the ram unit. In general, the hydraulic systems heretofore employed have been fairly satisfactory for effecting the usual raising or lowering movements of an implement. However, these systems have not proven entirely satisfactory in that they do not afford an infinite number of rates at which an implement can be either raised or lowered and as a result it is difficult, if not impossible, to effect increment adjustment of implement position and/or to increase the rate of implement lift as a function of a variable, such as draft force. Consequently, none of these known systems has proven particularly successful as a means for automatically regulating the depth of penetration of a soil working implement since, for the reasons previously stated, their responsiveness to variations in draft force is conducive to an excessive degree of hunting.

It is, therefore, an object of this invention to provide an improved control system for tractor propelled implements wherein parts are constructed and combined for coaction in a manner affording an infinite number of rates at which the implement can be raised or lowered, and/or affording an increment adjustment of implement position.

Another object of the present invention is to provide a tractor with an improved control system and hitch means combined for readily controllable connection with any type of tractor propelled soil working implement and which is operative when connected with the implement to regulate its operating position in response to changes in draft force.

Still another object of this invention is to provide a tractor with an improved control system incorporating features of construction and combination affording parts controllably connectable with any soil working implement propelled by the tractor so as to effect regulating movements of the implement at a rate which varies as a function of draft force.

It is also an object of the present invention to provide a tractor with an improved control system and draft bar structure operatively combined to afford swinging movement of the draft bar structure about a transverse pivot axis disposed forward of and below the axis of rotation of the rear traction wheels and which affords a rigid connection with a rear attached implement whereby the draft bar structure and implement are vertically adjusted as a unit about said transverse axis in response to variations in draft force.

Still another object of this invention is to provide a tractor with an improved implement control means wherein a pair of lift mechanisms are mounted on the tractor in longitudinally spaced relation for operative connection with front and rear attached implements, and wherein a ram unit is pivotally supported for vertical swinging movement about a transverse axis rendering said ram unit selectively positionable for operative connection with either one or the other of said lift mechanisms, as desired.

A further object of the present invention is to provide a tractor with an improved implement control combination wherein front and rear mounted soil working implements are readily connectable with a draft force responsive element and a power control means operative to regulate the operating position of such implement or implements in response to changes in draft force.

Still another object of this invention is to provide a tractor with an improved control and hitch means suitable for regulating the operating position of a wheel supported implement coupled with said hitch means and carrying a power lift means remote from the tractor.

An additional object of this invention is to provide an improved control system for tractor propelled soil working implements wherein features of construction and combination are directed toward affording simplification, positive regulation over a wide range, and increased utility as to its application.

The construction and operation of apparatus embodying the invention will become readily apparent as the disclosure progresses and particularly points out additional objects and advantages considered of special importance, and accordingly the present invention may be considered as comprising the various features of construction, combinations and/or subcombinations as is hereinafter more fully pointed out in the detailed description and appended claims, reference being had to the accompanying drawings in which:

Fig. 1 is a side elevation of a tractor rear attached implement combination embodying the invention with the left rear wheel removed and parts broken away for sake for clarity;

Fig. 2 is a partial plan view of the coacting portions of the drawbar and plow beam shown in Fig. 1;

Fig. 3 is a side view of the structure shown in Fig. 2 with parts disposed in partially detached position;

Fig. 5 is still another embodiment of the invention illustrating the application of draft control to both front and rear mounted implements, with parts broken away and the left rear wheel removed to more clearly show the construction involved;

Fig. 6 is a view taken on line VI—VI of Fig. 5;

Fig. 9 is a horizontal section taken on line IX—IX of Fig. 8;

Fig. 10 is a section taken on line X—X of Fig. 8;

Fig. 11 is a section taken on line XI—XI of Fig. 8;

Fig. 12 is a section taken on line XII—XII of Fig. 10;

Fig. 13 is a schematic illustration of the control system with some parts shown in section to afford a better understanding of its operation;

Fig. 14 is a sectional view showing the relation of the main valve to the passages controlled thereby when the valve is in its implement lowering position;

Fig. 15 is a view similar to Fig. 14 showing the valve positioned to hold the implement in a raised or partially raised position with all pumps discharging liquid to the return passage means; and Fig. 16 is a plan view of the single control lever taken on line XVI—XVI of Fig. 1.

Figure 4:
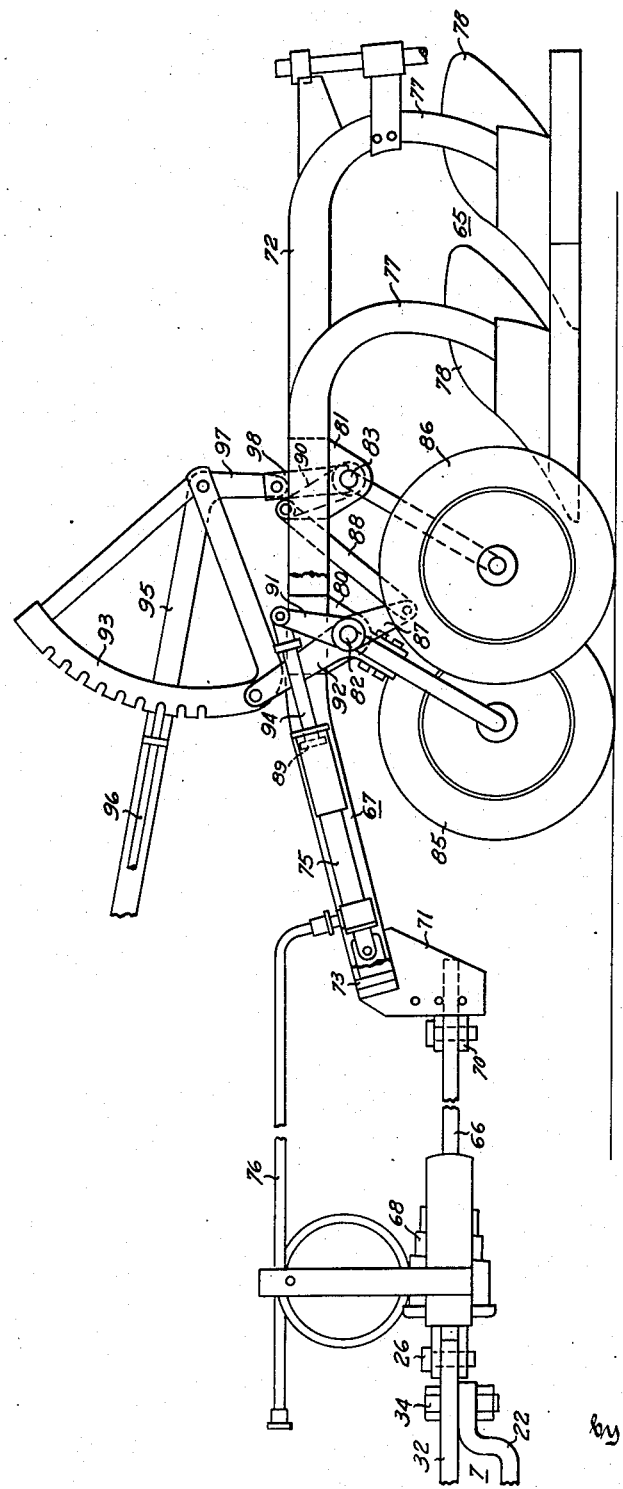
Fig. 4 illustrates a further embodiment of the invention showing the manner of applying draft regulation to a trailing implement.

Figs. 1 to 6, inclusive, of the accompanying drawings, illustrate three different applications of the present invention showing its use with soil working implements whether they be mounted on the front or rear of a tractor or drawn behind in trailing relation thereto. Referring particularly to Fig. 1 it will be seen that this figure illustrates application of the apparatus to a rear mounted plow. A conventional type tractor 1, having a pair of rear driving wheels 2 and front dirigible wheels 3 for supporting a frame 5, has a moldboard plow 6 attached thereto in rearwardly extending relation with respect to the rear driving wheels. For attaching the plow to the tractor there is provided a drawbar structure 7 and a support 8 therefor comprising a pair of laterally spaced plate members 10 fixed in depending relation to the under portion of the tractor, as by welding, immediately forward of and below the rear axle housing 11 (note Fig. 6), a bifurcated lever 12 integrally formed with a bearing means 15 adapted for positioning same between plate members 10, and a rod 14 extending through alined openings in lower portions of plate members 10 and through the bearing portion 15 of lever 12 thereby supporting the latter for swinging movement about rod 14. The lower portion of lever 12 has aligned transverse openings therethrough affording bearing means supporting a pivot pin 16 which in turn is connected to and supports the forward end of drawbar structure 7. The upper portion of this lever, hereinafter called the draft regulating lever, has a spring biasing means acting on it to oppose the draft force applied to the lower end of the regulating lever through drawbar structure 7. This biasing means includes a spring seat 17 rigidly fixed between upper forward portions of plate members 10 in transverse relation therewith, a compression spring 18 positioned on seat 17, and a plate member 20 fixed to the opposite end of the spring for engagement with forwardly projecting portions 21 of regulating lever 12. Thus it will be seen that draft force applied to the lower end of the regulating lever is opposed by the compressive force of spring 18 acting on the upper end of the lever.

Drawbar structure 7 comprises a bar member 22, a yoke 23 and pin 24 connecting the forward end of the drawbar with pivot pin 16 carried by the lower end portions of draft regulating lever 12 for vertical swinging movement of the drawbar relative thereto, and an opening in the rear portion of the bar member 22 for receiving a pin 34. In addition, there is provided a structure for guiding the swinging movement of the drawbar including a pair of vertical plate members 27 fixed to the under portion of rear axle housing 11 in depending laterally spaced and generally parallel relation with respect to each other, a pair of similar strap members 28 having their upper ends pivotally mounted on coaxially aligned pins 30 carried by plate members 27, a transverse guide bar 31 positioned between and carried by lower end portions of these strap members for rotation about a transverse axis, and a guide strap 32 fixed to the rear half of bar 22, as by bolts 34, in overlying vertically spaced parallel relation therewith. Guide bar 31 and guide strap 32 coact to afford guided swinging movement of drawbar 7 in both a horizontal and vertical direction. Openings 33 intermediate the ends of similar strap members 28 are adapted for alignment with similar openings 35 spaced along the rear portion of plate members 27 for placing a pin 36 through selectively aligned openings to limit the lowering movement of the drawbar.

Referring more particularly to Figs. 1 to 3 it may be seen that implement 6 comprises a conventional moldboard plow 37 fixed to a forwardly extending beam 38 having a downwardly arched forward portion 40. A bar member 41 curved similarly to portion 40 of the plow beam is disposed in laterally spaced relation thereto, being rigidly fixed to beam 38 by means of plate 42 and strap member 43. Plate 42 and member 43 interconnect bar 41 with arched portion 40 in a suitable manner such as by welding. In addition, a pair of vertically spaced strap members 45 and 46 are fixed between the rear portion of bar 41 and adjacent beam portion 40 and have aligned openings 47 therethrough adapted for alignment with a similar opening 48 in guide strap 32. The forward ends of beam portion 40 and bar 41 have coaxially aligned openings 50 therethrough for receiving a pin 51. To attach implement 6 to drawbar structure 7 the forward portion of the plow beam is placed so that plate member 42 underlies bar 22 with openings 47 coaxially aligned with opening 48 and pin 26 is placed therethrough. Pin 51 is placed through aligned openings 50 in the forward ends of bar 41 and beam portion 40 and rests against guide strap 32 (as shown in Fig.e 1) thereby preventing vertical swinging movement of plow 6 relative to drawbar structure 7. The above described method of attaching implement 6 to drawbar structure 7 affords a rigid connection therebetween making the combined structure movable as a unit relative to pivot pin 16.

For lifting and lowering the implement, that is vertically swinging the implement and drawbar as a unit about the support for the latter offered by pivot pin 16, there is provided a power lift means comprising generally a hydraulic pump 52 deriving power from the tractor engine 53, a ram 55 receiving fluid from the pump through a conduit 56, and a ram actuated lift mechanism 57 operatively interconnecting the ram and the implement. The lift mechanism includes a pair of vertically disposed plate members 58 fixed to and extending rearwardly from rear axle housing 11 in laterally spaced parallel relation with each other, a lift shaft 60 rotatably mounted in transversely aligned bearing means (not shown) carried by plate members 58 and a bellcrank lever secured to said shaft for turning movement therewith and having one arm 61 pivotally connected with the rearwardly extending piston rod 46 of ram 55, and having its other arm 62 extending rearwardly and pivotally connected with the upper end of a lift rod 63 which has its lower end pivotally connected with the underlying plow beam 38.

Referring again to drawbar support 8 shown in Fig. 1 it will be seen that draft regulating lever 12 is connected with the hydraulic pump unit 52 through a link 59 having a pivotal connection with the upper end portion of lever 12 and a lost motion (pin and slot) connection with an arm 54 extending from the pump control housing. Thus it is apparent that the drawbar is operatively connected with the hydraulic pump and it will be seen further along in the disclosure how this connection controls the action of the pump.

Looking now at Fig. 4 it will be seen that the present invention may be applied to a trailing implement, in this instance a two-bottom plow 65. The drawbar structure 7 described above for the mounted plow is again used and the two-bottom plow is attached to the rear end of the drawbar by placing hitch pin 26 through vertically aligned openings in the implement hitch bar 66 which in turn are aligned with the opening 48 in bar 32 of the drawbar structure 7 thereby affording lateral swinging movement of the implement relative to the drawbar structure. Implement hitch bar 66, preferably includes a conventional shock absorbing construction comprising relatively movable portions operatively interconnected through an interposed cushioning spring 68 adapted to absorb severe shocks caused by the implement striking rocks or the like. The rear portion of hitch bar 66 slidably engages a pair of vertically spaced strap members 70 fixed to a second pair of vertical plate members 71 fixedly attached to the forward ends of the plow beams 72. The plow beams are also joined at their forward ends by a U-shaped member 73 having its transverse portion acting to separate the ends of beams 72. Pivotally attached to this transverse portion of U-shaped member 73 and disposed rearwardly between the two plow beams is a ram unit 75 receiving pressure liquid from pump 52 on the tractor through a conduit 76. Plow beams 72 extend rearwardly in laterally spaced relation and each terminates in a curved portion 77 to which is rigidly attached a moldboard plow 78 of a conventional type.

Intermediate portions of beams 72 fixedly mount two longitudinally spaced pairs of opposed plate members 80 and 81 which are secured to the beams in depending relation thereto. These pairs of plate members mount pairs of aligned laterally spaced bearings receiving and supporting oppositely extending crank axles 82 and 83 carrying furrow and ground wheels 85 and 86, respectively. The forward crank axle 82 rotatably mounts a lever presenting a depending arm 87 connected with the forward end of a link 88 having its rear end pivotally connected with an upstanding arm 90 fixed on the horizontal portion of crank axle 83, and presenting an upstanding arm 91 pivotally connected to the adjacent end of rearwardly extending piston rod 94 of ram unit 75. The far side of crank axle 82 has a bracket 92 fixed thereto, the bracket extending upward therefrom and being pivotally connected with the lower forward portion of a notched quadrant 93 which in turn is pivotally connected with the rear portion of a coacting lever 95 carrying a latch rod 96 engageable with the notched portion of the quadrant. The rear end of lever 95 terminates in a depending portion 97 pivotally connected with an upstanding arm 98 fixed to the far side end of crank axle 83. And it should now be obvious that when lever 95 is latched to quadrant 93, a turning movement of crank axle 83 effects a similar turning movement of crank axle 82, and that when lever 95 is unlatched from quadrant 93, it may be moved relative to the quadrant thus effecting a leveling adjustment of furrow wheel crank axle 82 relative to the land wheel crank axle 83. Any turning movement of the lever (arms 91 and 87) relative to crank axle 82 effects an opposite turning movement of crank axle 83 through the medium of link 88 and arm 90. Consequently, upon admission of pressure liquid to ram unit 75, the piston rod moves toward the right thereby effecting a clockwise turning movement of lever arms 91 and 87 and a counterclockwise turning (raising) movement of both crank axles 82 and 83. If, however, pressure fluid is withdrawn from the ram unit, the weight of the implements acts to rotate both crank axles in a clockwise direction thereby lowering the implement and moving the ram piston 89 to the left and into its cylinder.

Thus it will be seen that the hydraulic ram 75 may be readily controlled to effect relative vertical movement of the plows 78 and wheels 85 and 86 with respect to each other, which, in effect, raises or lowers the plows relative to the ground. Also, it should be apparent that a draft force is exerted on the tractor drawbar structure 7 and support 8 through movement of plow bottoms 78 through the soil and that this force is transmitted to the pump control means in a manner similar to that for the attached plow.

Referring now to Figs. 5 and 6 it will be noted a draft control apparatus embodying the present invention has been applied to both front and rear mounted implements, in this instance front and rear mounted bedders. The drawbar support 8, draft regulating lever 12, and the draft regulating link 59 interconnecting lever 12 and pump 52 are all identical with those described for Fig. 1 and a description of these parts need not be repeated. However, it will be seen that triangular shaped plate members 98 have been placed in fixed relation on either end of pivot pin 16 carried by the lower end of draft regulating lever 12 thus affording means for connecting the front and rear implements in draft transmitting relation with the regulating lever. It will also be noted that in this case the ram unit 100 on the near side of the tractor has been swung forward for operating the front lift mechanism while the right hand ram unit 101 (shown in dotted lines) extends to the rear of the tractor for operating the rear lift shaft.

Mounted forward of the operator's station in overlying relation to pump unit 52 is a transverse lift shaft 102 supported on the tractor by strap members 103 fixed on either side of tractor frame 5. Rigidly fixed to the left end of lift shaft 102 in depending relation thereto is a lift arm 105 having pivotal connection with the piston rod 106 of the left hand ram unit 100. And, pivotally mounted near either end of the lift shaft are forwardly extending links 117 each having pivotal connection with the upper end of a tool bar standard 108. These laterally spaced standards 108 carry a tool bar 110, positioned transversely beneath the tractor, to which a pair of bedders 111 are attached by means of clamps 112. At the lower end portion of each standard is a bracket 113 pivotally connected with the forward ends of a pair of rearwardly extending links 115 having their rear ends pivotally connected with pins 116 extending outward from each of the triangular shaped plate members 98. Therefore, draft force on the front implements will be transmitted through links 115 and plate members 98 to draft regulating link 12. The near upper link 117 joining tool bar standard 108 with lift shaft 102 has an arm 118 depending therefrom in fixed relation thereto, the lower end of this arm being braced by strap member 120 extending upward to a forward portion of the link. Arm 118 is positioned in edge abutting relation with lift arm 105 and therefore movement of the lift arm in a forward direction will urge arm 120 and links 117 upward resulting in a lifting movement of standards 108, tool bar 110 and bedders 111.

The rear lift mechanism 57 is identical with that described for the rear mounted plow and therefore a further description of this mechanism is believed unnecessary. The rear mounted implement includes a pair of conventional tool bar standards 121 (only one of which is shown) pivotally carried at their upper ends by the rearwardly extending lift arms 62, a tool bar 122 positioned transversely with respect to the standards, a bedder 123 selectively positionable along the tool bar, and a pair of links 125 pivotally connected at their rear ends with the lower ends of tool bar standards 121 and at their front ends with pins 126 carried by triangularly shaped plate members 98. Links 125 serve to transmit the draft force on the rear implement to the draft regulating lever 12.

Referring particularly to Fig. 6 it will be noted that the rear bedder has its draft transmitting link or draft bar 125, positioned on triangularly shaped plate member 98 at a point which is twice the distance from pivot pin 16 as the point of attachment for the front bedder draft bars 115. Therefore assuming the draft on all bedders is generally equal and proportional to the number of bedders employed, the resulting force on draft regulating lever 12 will be the same for a single rear bedder 123 as it will be for the front two bedders 111, since the effective lever arm for the single rear bedder is twice the length of the lever arm for the two front bedders.

Figure 7:
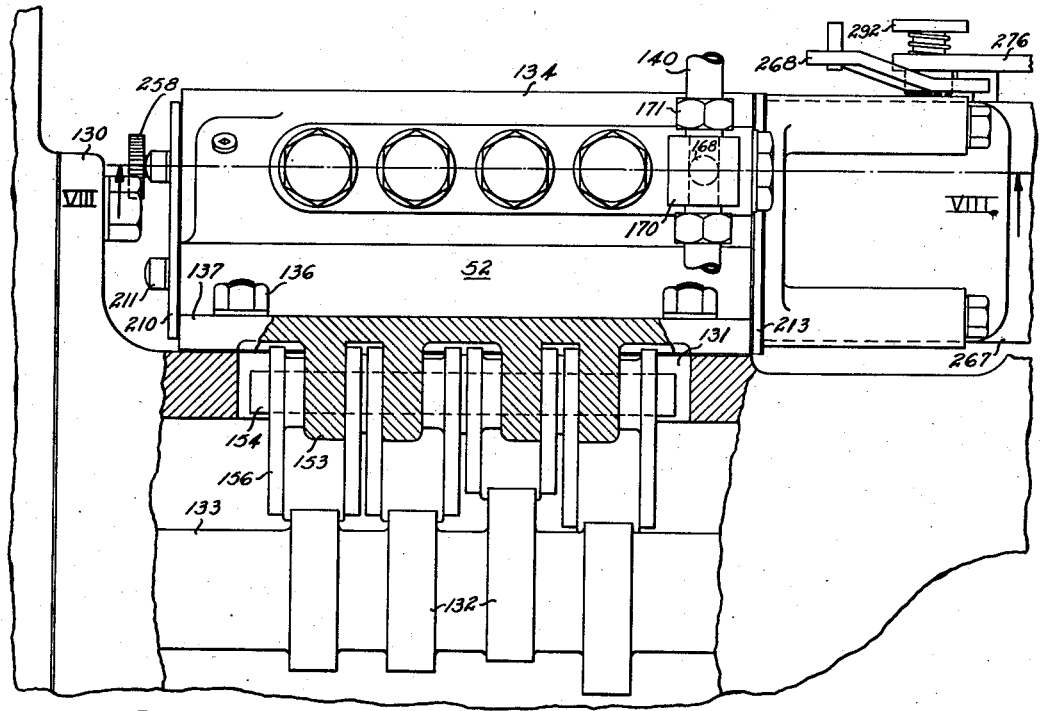
Fig. 7 is an enlarged plan view illustrating the manner of attaching the control unit to the tractor housing as indicated in Figs. 1 and 5 with a portion of the housing broken away to show the pump driving mechanism.

Referring now to Figs. 1 and 7 it will be seen that the hydraulic pump unit 52 is attached to a hollow lubricant confining portion of the tractor drive shaft housing 130. A side wall of drive shaft housing 130 is provided with an opening 131 therethrough which exposes cam portions 132 on the tractor drive shaft 133. And a hydraulic pump and control unit 52 comprising a housing 134 is detachably secured to the side of drive shaft housing 130, as by bolts 136, in covering relation with respect to opening 131 therethrough (Fig. 7). The side of housing 134 opposing opening 131 in drive shaft housing 130 is provided with marginal surfaces 137 for sealingly engaging the side wall surfaces of drive shaft housing 130 which bound opening 131. A hydraulic motor, in this case a single acting ram unit 138 (Fig. 13), is operatively connected with the pump and control unit housing 134 by a conduit 140 for the flow of lubricant to and from ram 138. Ram piston 141 is operatively connected with one arm of a bell crank lever 142 having a weight 143, representing an implement, attached to its other arm for actuation by the ram unit. As shown, the ram is in its expanded position and upon withdrawal of pressure fluid therefrom piston element 141 moves to the left and lowers weight 143. It will be understood that although the hydraulic system, particularly as shown in Figs. 7 and 13, is hereinafter described for use with a single ram unit it may also be used with two ram units as shown in Fig. 5.

Referring also to Figs. 8 to 15, inclusive, it will be apparent that the side of pump housing 134 enclosing opening 131 in hollow structure 130 is provided with four inwardly extending parallel cylindrical chambers 145, 146, 147 and 148, chambers 145 to 147 being of equal diameter and chamber 148 having a materially reduced diameter. A compression spring 150 (see Fig. 10) is positioned within each chamber at the inner end thereof and each chamber includes a pump plunger 151 having a reduced inner end portion 152 disposed in guiding relation within the associated compression spring 150. The opening enclosing side of housing 134 is also provided with outwardly extending projections 153 having aligned holes therethrough receiving and fixedly mounting a shaft or rod part 154 disposed at a right angle with respect to the axes of pump plungers 151 and generally parallel to a plane therethrough. And a plurality of cam followers 156, one for each pump, are pivotally supported on shaft part 154 for swinging movement relative thereto and relative to each other, the lower end portions of these followers being disposed between the outer ends of pump plungers 151 and the opposed cam portions 132 on shaft 133 thereby establishing an operative connection between power driven shaft 133 and pump unit 52 (see Fig. 7).

Pump housing 134 is provided with an intake manifold (Fig. 12) passage 157 severally communicating with pump chambers 145 to 148 through intake passages 158 and communicating with the lubricant in hollow structure 130 through a main intake passage 160 terminating in the opening enclosing side of housing 134 below the pump plungers therein. Passage 160 includes an extending conduit portion 161 (see Fig. 11) projecting outward therefrom through the opening 131 and downward into the fluid confined in hollow casing 130. Housing 134 is also provided with a cylindrical valve chamber 162 which extends therethrough in spaced overlying relation with respect to pump cylinders 145 to 148 and in parallel right angle relation thereto. A plurality of passages 163, one for each pump, severally connect the inner or discharge ends of the pump cylinders with longitudinally spaced portions of cylindrical valve chamber 162. In addition, housing 134 includes a horizontal bore 165 which is disposed above valve chamber 162 in generally parallel relation thereto and which is connected therewith through a group of passages 166 corresponding in number to pump discharge passages 163. And in this connection it should be noted that passages 166 communicate with valve chamber 162 in diametrically opposed relation to passages 163. Each passage 166 is provided with a spring biased ballcheck valve 167 controlling the flow of fluid therethrough and into bore 165. This bore, which may be considered a manifold space, communicates at its right hand end (note Fig. 8) with an outlet passage 169 for working fluid which terminates in an upwardly extending pipe connection 170 provided with a suitable connector 171 for coupling one or more ram hoses 56, 149 or the like thereto. Communication between outlet passage 169 and manifold space 165 is controlled by a spring biased ballcheck valve 172 preventing a back flow of fluid from passage 169 into the manifold space. In addition it should be noted that this discharge fluid passage 169 has a branch portion 173 on the discharge side of check valve 167 placing same in communication with the right hand end of cylindrical valve chamber 162.

Housing 134 is also provided with a main fluid return passage means comprising a horizontal bore 175 opening through the side surface of the housing closing the opening in hollow casing 130 at a point somewhat below and to one side of intake conduit 160 (Fig. 12), the inner end of return passage bore 175 communicates with a bore 176 at right angles thereto (Fig. 11) which extends nearly through the pump housing in generally parallel relation to and below valve chamber 162. This bore 176 is also disposed below pump chambers 145 to 148 and a plurality of passages 177 corresponding in number to pump discharge passages 163 place bore 176 in communication with longitudinally spaced portions of cylindrical valve chamber 162, these passages 177 being disposed adjacent the pump cylinder chambers and the passages 163 severally connecting the discharge side of the pumps with longitudinally spaced portions of cylindrical valve chamber 162 as previously described. Another passage 178 places main return passage bore 176 in communication with a right end portion of valve chamber 162 in longitudinally offset diametrically opposed relation with respect to the branch portion 173 of outlet passage 169.

In addition, housing 134 is provided with a cylindrical unloading chamber 180 extending therethrough in laterally spaced parallel relation with respect to cylindrical valve chamber 162 and on a horizontal level therewith. The left hand end of manifold bore 165 communicates with the adjacent end of unloading chamber 180 by means of a passage 181 (Fig. 12) and an intermediate portion of this unloading chamber communicates with a horizontal discharge passage 182 (Figs. 9 and 10) opening through the side surface of the pump housing above the pump chambers.

The left end portion 183 of unloading chamber 180 is somewhat enlarged to provide an internal shoulder 185 against which is positioned a disk type spring seat 186 having an opening 187 therethrough. The opposite or left hand end of chamber portion 180 is closed by a cylindrical plug element 188 having an inner end portion 190 of reduced diameter projecting axially toward spring seat 186 in spaced relation with respect to the surrounding wall of chamber 180. The left hand end of plug member 188 is provided with a circumferential external groove 191 communicating with passage 181 leading thereto from manifold space 165. A transverse bore 192 connects diametrically opposed portions of groove 191 with a central bore 193 which extends inward from transverse bore 192 and coaxially through the reduced portion 190 of plug member 188. Central bore 193 is enlarged from a point adjacent transverse bore 192 to the discharge side thereof to provide a seat for a ball valve 195 and to receive cylindrical valve element 201. A cylindrical spring seat element 197 slidably surrounds the reduced end portion 190 of plug member 188 and is provided at its open end with a peripheral flange 198 slidably engaging the internal surface of unloading chamber portion 180, this flange also affording a seat for a compression spring 200 disposed between same and disk seat 186. The inner end of element 197 is provided with an internal recess forming a cylindrical seat 204 receiving the inner end of cylindrical valve element 201 which, through the action of spring 200, acts to hold this valve element and ball valve 195 positioned as shown in Fig. 9, that is, with the ball valve firmly engaged with its seat thereby preventing a flow of fluid therepast from manifold 165. And when thus positioned, it will be noted that the flanged end of spring seat element 198 is spaced from the opposed inwardly facing shoulder presented by plug member 188. The reduced portion 190 of plug member 188 is provided with a transverse bore 202 therethrough and is further reduced from its junction with the main portion of the plug member 188 inward to a point beyond transverse bore 202 so as to provide an annular relief passage 203 which communicates with the spring housing portion of chamber 180 through one or more axial slots 205 in the peripheral edge portion of flange 198. Cylindrical valve element 201 is also provided with an axial bore 206 extending from the ball valve end thereof approximately to its midpoint where it communicates with a circumferential groove 207 adapted to place the space between the end of valve element 201 and the seat for ball valve 195 in communication with the transverse bore 202 in plug member portion 190, thus providing a relief passage means for the space surrounding ball valve 195 when seated as shown in Fig. 9. Also, the inner end portion of cylindrical spring seat element 197 is provided with transverse bore 208 therethrough for relief of any liquid accumulating between same and the inner end of plug member reduced portion 190.

The left hand end of unloading chamber 180 and of cylindrical valve chamber 162 are closed by a cover plate 210 secured in end abutting relation to housing 134 by means of cap screws 211 or the like. The right hand end of unloading chamber 180 mounts a cylindrical spring seat 212 and is closed, as is also the corresponding end of valve chamber 162, by means of a cover plate 213 fixedly secured thereto by one of more cap screws 215. A pressure responsive piston 216 is mounted in unloading chamber 180 in down stream relation with respect to spring seat disk 186 and is detachably connected with a movement transmitting rod 217 which extends coaxially through cylindrical spring seat 212 and through an aligned and somewhat enlarged opening 219 in cover plate 213. The outer or exposed end of control rod 217 is fixedly connected with and carries a stub shaft 220 which projects at a right angle therefrom in the direction of valve chamber 162 and in generally parallel relation to cover plate 213. A compression spring 221 is interposed between seat 212 and the opposed end of piston 216 in surrounding relation to piston rod 217, this spring acting to move the piston toward the left as viewed in Fig. 9 in closed relation with respect to fluid return passage 182. It will be noted that the right hand end of unloading chamber 189 is provided with another fluid return passage 222 (Fig. 9) opening through the side face of the housing enclosing opening 134, this additional passage functioning to return any liquid tending to become trapped between piston 216 and cylindrical spring seat 212.

Referring again to Fig. 8 it will be seen that a cylindrical liner comprising axially separable sections 225 to 229 is disposed in cylindrical valve chamber 162 with innermost section 229, that is, the section adjacent the right hand end of chamber 162, abutting cover plate 213. The opposite end section 225, that is, the section at the left hand end of chamber 162 is held in position by end abutting engagement with cover plate 210. Cylindrical sections 225 to 229 are provided with circumferential external grooves 231 placing pump discharge passages 163 in communication with the check valve controlled passages 166. In addition each section is provided with transverse bores 232 (see also Fig. 9) placing the interior thereof in communication with the diametrically opposed pairs of passages 163 and 166. Furthermore the end abutting portions of cylindrical sections 225 to 229 have parts thereof cut away and shaped to afford circumferential external grooves 233, rectangular in cross section, each of which communicates with the interior of the chamber formed by these sections through diametrically opposed transverse passages 234. The rectangular external passages 233 formed between end portions of cylindrical liner sections 225 through 229 communicate with passages 177 placing same in communication with the main fluid return passage 176. In addition, the innermost cylindrical section 229 is provided with two additional circumferential external grooves 236 and 238, groove 236 communicating with ram outlet passage 173 and with a transverse bore 237 placing diametrically opposed portions of this groove in communication with the interior of section 229, whereas groove 238 communicates with a passage 178 which in turn communicates with the right hand end of main fluid return passage 176. Groove 238 also communicates with the interior of liner section 229 through diametrically opposed transverse bores 240.

A cylindrical control valve 241 is positioned in the generally cylindrical chamber formed by the end abutting liner sections 225 to 229 and preferably this valve is formed by a series of separable cylindrical elements, 242 to 245 inclusive, disposed in end abutting relation, the end abutting portions of these cylindrical valve elements being reduced to form annular spaces between same and the surrounding internal surfaces of the liner sections. In this connection it should be noted that the right hand or innermost valve element 245 comprises an intermediate reduced portion 247 uniting enlarged cylindrical portions 248 and 250 which in turn terminate in reduced oppositely projecting end portions, the inner one of which abuts the reduced portion on adjacent element 244 and the other of which projects through a coaxial opening 251 in cover plate 213. The valve elements are held in end abutting relation for movement as a unit by means of a compression spring 252 seated on valve element 242 in surrounding relation to the reduced outer end portion thereof with its opposite end abutting the inner surface of cover plate 210. Movement of the valve element to the left as viewed in Fig. 8 may be adjustably limited through the medium of an inwardly projecting part 253 carried by cover member 210, this part having an internally threaded bore 255 extending therethrough in which is adjustably mounted a screw threaded element 256 having a reduced end portion 257 disposed in coaxial abutting relation with respect to a similar projection on the adjacent valve element 242. The outer exposed end of element 256 is provided with a knurled adjusting knob 258.

Referring more particularly to Figs. 9 and 12 it will be noted that the shaft 220 carried by control rod 217 operatively mounts a sleeve 259 having an enlarged portion 260 positioned in opposed engaged relation with respect to the reduced end portion of the innermost valve element 245 which extends through cover plate 213. Shaft 220 also has connected therewith the upper end of a lever 261 through sleeve 259, this lever having an intermediate portion thereof pivotally connected with a link 262 which in turn is pivotally connected with an arm 263 fixed to an inner end portion of a shaft 265 rotatably supported in a bearing structure 266 carried by control linkage housing 267. This housing is detachably secured in abutting sealed relation against cover plate 213 by means of suitable cap screws 269 or the like. And in this connection it should be noted that cover plate 213 is provided with a suitable opening 264 (note Fig. 8) which is aligned with and places main return passage bore 176 in communication with the interior of the linkage housing. Consequently housing 267 contains oil at a level conforming with that in drive shaft housing 130. The outer end of shaft 265 has a lever arm 268 fixed thereto which in turn may be connected through a link 270 (see Fig. 1) with a suitable manually actuable control lever 271 carried by the tractor steering column 272 and associated with a quadrant 273. The bottom portion of housing 267 contains levers operatively connecting the lower end of lever 261 with the draft regulating link 59 (shown in Figs. 1, 5 and 6). For example, a shaft 274 is rotatably supported in a bearing 275 mounted in the lower portion of housing 267 and has an arm 276 fixed to its outer portion affording connection with draft regulating link 59 through means of a pin 277 carried by the end of arm 276 which slidably engages a slotted end portion 278 of the draft regulating link, arm 276 carrying a lockout screw 279 engageable with an internally threaded bore 284 in the lower portion of housing 267. The inner part of shaft 274 has fixed thereto an arm 280 having a pin 281 projecting transversely with respect to the end of the arm. Another shaft 282 is rotatably mounted in a bearing means carried by housing 267 and fixedly supports on its inner portion a cam lever 283 having a curved edge 285 thereof adapted for engagement by pin 281 on arm 280. The lower portion of cam lever 283 carries a transversely projecting pin 286 which slidably engages a slot 287 in the lower portion of lever 261. It should be noted at this point that manual control lever 271 may be moved so as to shift the fulcrum for lever 261, that is the fulcrum 288 afforded by the connection of link 262 to an intermediate portion of lever 261, and thereby move the top of lever 261 relative to cover plate 213. Also, movement of draft regulating link 59, transmitted through the levers carried by the lower portion of housing 267, causes a swinging movement of lever 261 about the fulcrum point 288. More specifically, spring 221 in unloading chamber 189 is relatively strong as compared with the spring 252 acting on control valve 241 and consequently piston 216, control rod 217 and valve 241 tend to assume the positions shown in Figs. 9 and 12. Therefore, the above mentioned position of valve 241, control rod 217 and piston 216 may be changed either (1) by moving manual control lever 271 to effect a shifting of fulcrum 288 in a direction away from cover plate 213 and thus pivot lever 261 about pin 286, or (2) by a movement of draft regulating link 59 away from pump housing 267 causing pin 281 to engage cam lever 283 and thus swing lever 261 in a clockwise direction (as viewed in Fig. 12) about its fulcrum 288. Either of these actuations of the common motion transmitting member 261 moves rod 217 and piston 216 toward the right as viewed in Fig. 12 which in turn compresses spring 221. As a result of such movement, spring 252 urges control valve 241 toward the right (note Fig. 9) and acts to maintain the reduced right hand end of this valve in engagement with roller 260. Movement of the valve in the direction just described, that is, toward the right is limited by engagement of the enlarged portion 250 of valve element 245 with cover plate 213.

Figure 8:
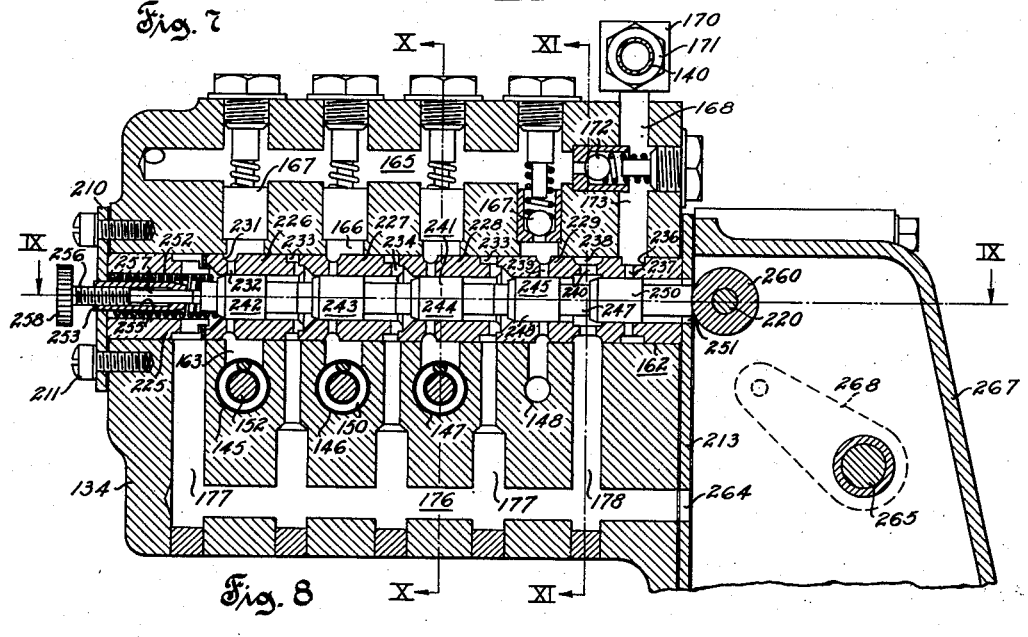
Fig. 8 is a vertical section taken on line VIII—VIII of Fig. 7.

When operating with the parts positioned to obtain maximum lifting effect, that is, in their full lift position, as shown in Figs. 8, 9 and 12, it will be noted that the enlarged cylindrical portions of the valve elements 242 to 245, inclusive, close transverse bores 232 and that, therefore, the pumps are severally connected with manifold space 165 through passages 163, external grooves 231, and through check valve controlled passages 166. The liquid entering manifold space 165, assuming all liquid has been drained from the ram 138, flows therefrom through check valve control passage 168 and quickly attains a pressure sufficient to rapidly effect a weight lifting power stroke or expansion of the ram unit. When this occurs the pressure of the liquid in manifold space 165 continues to increase until the pressure attained is sufficient to unseat pressure relief ball valve 195 whereupon the check valve assembly comprising ball valve 195 and cylindrical valve element 201 moves toward the right compressing spring 200 until valve element 201 opens transverse pressure relief bore 202. When this occurs, pressure fluid flows therethrough into annular space 203, then through the axial passages 205 in the periphery of flange portion 198 of spring seat element 197, then into the spring housing chamber from which it flows through the opening 187 in disk spring seat 186 and then into the space between this seat and the head of piston 216. This pressure fluid then acts on piston 216 and moves same toward the right thereby opening relief passage 182, which is in communication with the source of oil in hollow structure 130 and in linkage housing 267. This movement of piston 216 results in a movement of control rod 217 toward the right sufficient to bring the lower end of lever 261 into engagement with the side of cover plate 213 which engagement limits the movement of the piston 216 and control rod 217 in this direction. As a result spring 252 causes control valve 241 to move toward the right in following engaged relation to roller part 260 and to the position indicated in Fig. 13. In this, the pump unloading position, the enlarged bore controlling portions of valve elements 242 to 244, inclusive, place transverse bores 234 in the associated liners in communication with return passages 177 thereby severally connecting the discharge sides of pumps 145, 146, and 147 in communication with the main return passage bore 176. However, it should be noted that the enlarged portions 248 and 250 of valve element 245 remain in closed relation with respect to transverse bores 239 and 237, respectively, and therefore pump 148 continues to deliver fluid through circumferential groove 231 and into manifold space 165 through the associated check valve controlled passage 166.

It should be noted that the end area of cylindrical relief valve element 201 is considerably greater than the area of the passage controlled by ball valve 195 and that consequently it requires a relatively high pressure to effect an initial opening movement of these two valves. However, once an opening relation is established, the increase in effective area afforded by cylindrical relief valve element 201 operates to maintain the relief passage means open under a considerably reduced pressure head. Therefore, in the position just described, that is, the unloading position of main control valve 241, the three plungers in chambers 145, 146 and 147 are delivering fluid to the return passage means 176 whereas only one plunger, the one in chamber 148, is delivering fluid to the manifold space 165 and this fluid, assuming there is no appreciable leakage from the ram circuit, returns to the source through the relief means comprising passage 181, bores 192 and 193 in plug element 188, relief valve elements 195 and 201, transverse bore 202 in plug element reduced portion 190, passages 203 and 205, the opening 187 through disk seat 186, and passage 182. In this connection it may be well to note at this time that although the enlarged cylindrical flow controlling portions of valve 241 are of substantially equal axial length, the reduced portion are of different axial lengths and in addition the axial spacing of the circumferential grooves 236, 231, 233 and 238 and of the transverse bores or passages 232, 234, 237, 239 and 240 connected therewith vary somewhat as to their axial spacing so as to afford the above mentioned regulation in response to an unloading movement of the control valve.

In the absence of excessive leakage, more particularly leakage through the flexible hose and the connections between such hose and the ram cylinder and pump housing, main control valve 241 will remain in its unloading position until either fulcrum 288 of lever 261 is shifted by actuation of manual control lever 271, or until a change in draft force moves regulating link 59 to cause cam lever 283 to swing lever 261 about its fulcrum 288 and with control valve 241 in its unloading position the hydraulic ram unit 138 will remain in its extended weight lifting position. However, if for any reason the pressure in manifold space 165 should decrease below that necessary to hold ball valve 195 and cylindrical relief valve 201 in their passage opening positions (note Fig. 13) these valves will close the relief passage means 181 and, as the liquid drains from the space ahead of piston 216, spring 221 will move piston 216 and control rod 217 to the left thus repositioning the main control valve 241 to connect all pumps to manifold space 165, this initial position of main control valve 241 being determined, as previously indicated, by the position of manual control lever 271.

However, if with the control valve 241 in either its full lift or unloading positions previously described it becomes desirable to lower the weight, all that has to be done is to move manual control lever 271 to a lowering position, that is, in a direction effective to shift fulcrum 288 for lever 261 away from cover plate 213 a distance sufficient to permit spring 252 to move main control valve 241 to the right until the discharge sides of all pumps and the ram relief passage means (232, 239 and 237) are in communication with return passages 177 and 178, respectively, which in turn are in continuous communication with the main return passage means 176. Under these conditions liquid rapidly drains from the ram circuit, ram piston 141 moving to its retracted position through gravity action of the weight or other means actuated thereby. In other words, if the weight were to be considered as representing an agricultural implement or other load, a movement of valve 241 to its lowering position shown in Fig. 14 rapidly drops the implement onto the ground. If, however, it is desired to gradually lower the weight or implement onto the ground, this can be readily accomplished simply by moving main control valve 241 so as to just barely open the passage means 237 placing the ram relief passage 173 in communication with the return passage means 178 and 176. And if in this connection it should be desired to place all pumps in communication with the return passage means 176 through passages 177 and yet retain the ram in its extended position, this can be readily done by manually shifting fulcrum 288 of lever 261 so as to position main control valve 241 as indicated in Fig. 15. When this positioned, it will be seen that the enlarged portion 250 of the cylindrical control valve section 245 closes the transverse bore 237 to prevent placing the ram relief passage 173 in communication with the return passage means 178 and 176.

It should also be obvious that in addition to the various positions of the main control valve 241 hereinbefore described, the valve may be also positioned by a manual shifting of the fulcrum 288 for lever 261 so as to, if desired, effect a ram expanding action by connecting the discharge sides of two or more pumps with the check valve control passages 166 connecting same with manifold space 165. And while it is normally intended that the enlarged cylindrical portions of main control valve 241 will be positioned so as to either open or close the radially extending transverse bores or passages 232, 237 and 239 placing the circumferential external grooves 236 and 231 in communication with the interior of the valve chamber formed by liner sections 225 to 229, inclusive, it should be obvious that the valve elements may be positioned so as to only partially open one or more of transverse passages 232, 237 and 239. Furthermore, it should be apparent that while the particular arrangement of the passages and valve elements herein shown for purposes of illustration constitutes a preferred embodiment of the present invention, other arrangements can be readily made as desired simply by changing the actual spacing of the control passages 232, 237 and 239, circumferential grooves 236, 238, 231 and 233 and/or the axial length of the enlarged passage controlling portions of valve elements 242 to 245, inclusive.

Referring again to Figs. 8, 9 and 12, it will be apparent that the position of valve 241 determines whether the weight, implement or device connected with ram unit 138 is to be raised, lowered or held in a selected position and, if the weight is being either raised or lowered, the rate of movement thereof. In addition, it should be apparent that irrespective of the rate of lift, as soon as the pressure head on the pump attains a predetermined value, the relief passage means 181 is immediately opened through the coaction of ball valve 195, cylindrical valve element 201, and piston 216. Furthermore, if the lift position of valve 241 is such that more than one plunger is delivering fluid to manifold space 165, opening of the relief passage means 181 results in an immediate movement of this valve to its unloaded position shown in Fig. 13. In any case, once the relief passage means is initially opened in response to attainment of a pressure sufficient to unseat ball valve 195, it is held open by the then dominating action of cylindrical valve element 201 thereby effecting a material reduction in pressure head, as previously described.

In the operation of hydraulic motors, and more particularly ram units, a high initial pressure is usually required to overcome the inertia of the load and/or effect a desired acceleration thereof. And in order to rapidly effect a complete power stroke, the capacity of the liquid supplying pump must be such as to quickly establish and maintain an effective pressure for any rate of ram displacement. However, upon completion of a load shifting or moving power stroke, generally only a fraction of the initial pressure is required to retain the load in the position to which it has been shifted. For example the operation of a ram system such as herein disclosed, particularly if applied to various types of agricultural implements, may require a power stroke pressure of as much or more than 3500 pounds per square inch and a load retaining pressure of only 1200 pounds per square inch. In addition, if it were possible to maintain perfect seals, particular reference being had to the seating of valves 167, 172 and 195 and the sealing action of the enlarged portions of main valve sections 242, 243, 244 and 245, operation of the pump means could be discontinued providing ram operation is infrequent. Usually, however, the ram is frequently operated and its operation is nearly continuous when applied as a draft regulating device. Consequently, the feature of effecting a reduction in pressure head as previously pointed out is important in that it not only reduces pump load and heating, both of which are detrimental to pump life, but it also efficiently compensates for leakage and conditions the system for an immediate response to load requirements.

Referring generally now to Figs. 1 and 16 the operation of apparatus embodying the present invention will be described with specific reference to other figures being made as the description progresses. Assuming that the attached plow 6 is in transport or fully raised position to begin with, the action of the apparatus will be described as the plow is lowered to the ground and assumes a soil working position. With the implement thus positioned, valve 241 is in its unloaded position (Fig. 13) and the lower end of lever 261 will have moved from its position shown in Fig. 12 to a position abutting cover plate 213 as previously described. And, since manual control lever 271 was moved to "full lift" (position A in Fig. 16) to initially raise the plow to its transport position, fulcrum 288 of lever 261 will be in its limiting position to the left. To lower the implement the operator moves manual control lever 271 to a "lowered" position, for example, the position designated D in Fig. 16, wherein control valve 241 assumes the position shown in Fig. 14 with all four pumps delivering through transverse passages 234, grooves 233 and passages 177 back to the source and the ram discharge passage 173 has communication with the ram relief passage 178 through control valve chamber 162. Movement of control lever 271 to this "lowered" position pivots lever 261 about pin 286 in a clockwise direction thereby moving stub shaft 220 and sleeve portion 260 to the right and away from control valve 241 which then moves to its farthermost position to the right as viewed in Fig. 14. The weight of the implement then forces ram piston 141 back to its retracted position (not shown) and the implement rests on the soil. At this point fulcrum 288, shaft 220 and sleeve portion 260 have moved to their limiting positions away from cover plate 213 and valve 241, by reason of lever 261 pivoting about pin 286, is moved to its rightmost position.

Having determined through previous experience the amount of draft which gives a desired depth of soil penetration for the plow in a particular field, the operator next sets control lever 271 to that predetermined position on quadrant 273; that is, to a position within the draft regulating range designated B—D (Fig. 16). This in effect shifts fulcrum 288 back to the left to a point intermediate its limiting positions thereby causing sleeve portion 260 to approach cover plate 213 and to approach or contact the adjacent end of valve 241, lever 261 being once more pivoted counterclockwise about pin 286. As previously indicated, this selected position will be in the lowering range of the control valve travel with no pumps delivering to manifold 165. When the tractor moves forward the point of the plow enters the ground and a tensive draft force is transmitted through drawbar 22 to the lower portion of draft regulating lever 12. This application of force increases as the plow goes deeper into the ground and as a result, lever 12 pivots against the resistance afforded by spring 18 thereby moving draft regulating link 59 forward so that the left end of the slot 279 therein tends to move away from pin 277 on arm 276. However, since the pin 281 on arm 280 is in engagement with the lower portion of lever 261 through lever 283 and since the shaft 274 mounting arms 276 and 280 is now free to turn in a counterclockwise direction as viewed in Fig. 12, the spring 221 surrounding control rod 217, which is stronger than valve spring 252, causes lever 261 to pivot in a counterclockwise direction about its fulcrum 288. Consequently this movement of lever 261 operates to bring the enlarged sleeve portion 260 on shaft 220 into engagement with the adjacent end of valve 241 thereby moving same to the left and into an implement raising position, the extent of such movement depending on the position of fulcrum 288 as determined by the selected position of manual lever 271. As the implement lifts, due to one or more pumps delivering liquid to the ram unit or units, the draft force transmitted to lever 12 decreases and as a result spring 18 will move link 59 rearwardly thereby turning shaft 274 and the arms 276, 280 thereon in a clockwise direction which in turn effects a similar movement of lever 261 about its fulcrum 288. And it should now be obvious that this resulting clockwise movement of lever 261 permits spring 252 to move valve 241 to an implement lowering position conforming with the decrease in draft force and the position of hand lever 271.

In traveling through a field wherein the type and condition of the soil are uniform, lever 261 will operate as above described and assume a generally stable position at which the draft force balances the lift force produced by the pumps. However, should the type and/or condition of the soil vary materially and it is desirable to plow at the same depth as before, a manipulation of manual control lever 271 is necessary. For example, if the soil becomes heavier, hand lever 271 should be shifted toward point D in the draft regulating range thus moving fulcrum 288 further toward the right as viewed in Fig. 12 whereas if the soil becomes lighter, lever 271 should be shifted toward point B. In this connection, it is to be understood that whenever hand lever 271 is positioned in the range A—B (Fig. 16) one or more pumps are operating to deliver liquid to the ram unit or units whereas when this lever is positioned within range B—C all pumps are discharging liquid to return passages 177 and the passage leading to the ram unit or units is in communication with return passage 178.

Therefore, it should be obvious that the rate at which an implement can be raised or lowered depends upon the position selected for lever 271 within the ranges A—B and B—C, respectively, that when the lever is within range A—B and adjacent point A the rate of lifting is a maximum whereas when the lever is adjacent point B the rate of lifting is a minimum, and that when the lever is within range B—C and adjacent point B the rate of lowering is a minimum whereas when the lever is adjacent point C the rate of lowering is a maximum. Movement of hand lever 271 past point C and toward point D operates to merely move shaft 220 and sleeve portion 260 (attached to the upper end of lever 261) away from the adjacent end of valve 241 and toward the extreme position indicated in Fig. 14, valve 241 being prevented from then following sleeve portion 260 by engagement of its enlarged portion 259 with the inner side of cover plate 213. Consequently, if hand lever 271 be positioned between points C—D, the draft force necessary to bring sleeve portion 260 into operative engagement with the adjacent end of valve 241 is determined and varied in accordance with the selected position of this lever. This is an important feature in that it affords an effective range of draft regulation without effecting a preloading of the spring 18 which acts on lever 12 in opposition to the draft induced force thereon. However, if desired, spring 18 may be preloaded thereby increasing the effective range of draft regulation to include all positions of lever 271 between points B and D.

In general, the system which operates the draft regulation comprises a drawbar support member 12 operatively mounted on a tractor for limited fore and aft movement longitudinally thereof and a resilient means 18 carried by the tractor in a position resisting the movement of support member 12 in the direction it would normally be urged by the ground penetration of a soil working implement 6 having a propelling connection therewith. A mechanism 57 operatively mounted on the tractor is adapted for lifting the soil working implement 6, and a plurality of power transmitting means, represented in the embodiment of the invention by pump plungers 151, operatively interconnects a power source, shown as engine 53 on the tractor, and mechanism 57 for simultaneous actuation of the latter. A movable control part 241 is operatively associated with the power transmitting means 151 for progressively varying the number of power transmitting means effective to actuate mechanism 57, and additional control means comprising the linkage elements 261, 263, 281, 286, 276 and 278 connect support member 12 with control part or valve 241 and render the latter operative to increase the number of pump plungers 151 effective to actuate mechanism 57 and thereby the rate of lift in accordance with the extent support member or lever 12 moves longitudinally in the aforementioned direction. In the embodiment of the invention shown, mechanism 57 is actuated by ram 55 which is subjected to hydraulic pressure from plungers 151, the flow from which is controlled by valve 241 so that the discharge from the individual pumps may be progressively directed either to ram 55 or back to the source of liquid in housing 130.

It is sometimes desirable to dispense with draft regulation in performing certain operations and, referring again to Figs. 9 and 12, it should be obvious that arm 276 can be locked or secured in fixed relation to housing 267 simply by moving arm 276 to a position wherein screw 279 is aligned with bore 284 in housing 267 and engaging the screw in position within the bore. And since it will be noted that pin 277 is in the upper limit of the slotted end portion 278 of the draft regulating link it should be obvious that any further draft induced movement of this link will merely shift slotted end portion 278 relative to the now fixedly positioned pin 277. For readily turning screw 279 a knurled knob 292 is provided, and spring 293 is positioned between knob 292 and arm 276 for urging screw 279 outwardly and thus preventing displacement of same due to vibration of the tractor.

It should also be obvious that the construction and combination of parts herein disclosed responds solely to draft induced force and therefore functions to regulate the operating position of a soil working implement independent of the weight of the implement and independent of effecting a change in its angular position relative to the soil. This is another important feature in that it not only renders the apparatus applicable for regulating the operating position of all types of implements, but it avoids effecting such regulation as an incident to a change in the angular relation of the implement relative to the ground, the latter being objectionable as it is conducive to over regulation or hunting and requires a special hitch means.

Another feature of considerable importance is that the rate of lifting effected by a change in draft induced force and thereby the responsiveness of the apparatus varies as a function of the rate of increase in such force since if the draft induced force rapidly increases, more pumps are quickly brought into action. In addition, the apparatus herein disclosed affords means for effecting automatic regulation of the operating position of an implement in response to variations in draft induced force and it also affords means whereby the automatic regulation may be readily dispensed with when and if desired and which will then afford an increment adjustment of implement position.

And it should be obvious that although the automatic draft regulation of an implement has been described with particular reference to a rear mounted implement such as is shown in Fig. 1, the operation is essentially the same for implements mounted on or attached to the tractor as illustrated in Figs. 4 and 5. The latter illustrations clearly indicate that the apparatus is applicable to all types of tractor propelled implements. And it should therefore be understood that it is not intended to limit the invention to the exact constructions and combinations hereinshown and described as various modifications within the scope of the appended claims may occur to those skilled in the art.

It is claimed and desired to secure by Letters Patent:

1. In combination with a tractor having a power source, a drawbar support member operatively mounted on said tractor for limited fore and aft movement longitudinally thereof; a resilient means carried by said tractor in a position resisting said movement of said support member in the direction it would normally be urged by the ground penetration of a soil working implement having a propelling connection therewith; a mechanism operatively mounted on said tractor in a position adapted for lifting a soil working implement having a propelling connection with said support member; a plurality of power transmitting means operatively interconnecting said source and said mechanism for simultaneous actuation of the latter; a movable control part operatively associated with said power transmitting means for progressively varying the number of power transmitting means effective to actuate said mechanism; and additional control means operatively connecting said support member and said control part and rendering the latter operative to increase the number of said power transmitting means effective to actuate said mechanism and thereby the rate of lift in accordance with the extent said support member moves longitudinally in said direction.

2. In combination with a tractor having a power source; a drawbar support member operatively mounted on said tractor for limited fore and aft movement longitudinally thereof; a resilient means carried by said tractor in a position resisting said movement of said support member in the direction it would normally be urged by the ground penetration of a soil working implement having a propelling connection therewith; a mechanism operatively mounted on said tractor in a position adapted for lifting a soil working implement having a propelling connection with said support member; a plurality of power transmitting means operatively interconnecting said source and said mechanism for simultaneous actuation of the latter; a movable control part operatively associated with said power transmitting means for progressively varying the number of said transmitting means effective to actuate said mechanism; a manually shiftable element operatively connected with said control part for moving same so as to selectively vary the number of said power transmitting means operative to effect a lifting actuation of said mechanism; and additional control means operatively connecting said support member with said control part and including a connection with said manually shiftable element rendering said additional means operative, whenever said manually shiftable element is in a position rendering less than all of said power transmitting means operative to actuate said mechanism, to move said control part to increase the number of said power transmitting means effective to actuate said mechanism and thereby the rate of lift in accordance with the extent said support member moves longitudinally in said direction.

3. In combination with a tractor having a power source; a drawbar support member operatively mounted on said tractor for limited fore and aft movement longitudinally thereof; a resilient means carried by said tractor in a position resisting said movement of said support member in the direction it would normally be urged by the ground penetration of a soil working implement having a propelling connection therewith; a mechanism operatively mounted on said tractor in a position adapted for lifting a soil working implement having a propelling connection with said support member; a plurality of power transmitting means operatively interconnecting said source and said mechanism for simultaneous actuation of the latter; a movable control part operatively associated with said power transmitting means for progressively varying the number of said power transmitting means effective to actuate said mechanism; additional control means operatively connecting said support member and said control part and rendering the latter operative to increase the number of said power transmitting means effective to actuate said mechanism and thereby the rate of lift in accordance with the extent said support member moves longitudinally in said direction; and a manually shiftable element operatively connected with said control part so as to move said control part to a predetermined position rendering said additional means and said support member inoperative to cause actuation of said mechanism.

4. In combinaation with a tractor having a power source; a drawbar support member operatively mounted on said tractor for limited fore and aft movement longitudinally thereof; a resilient means carried by said tractor in a position resisting said movement of said support member in the direction it would normally be urged by the ground penetration of a soil working implement having a propelling connection therewith; a mechanism operatively mounted on said tractor in a position adapted for lifting a soil working implement having a propelling connection with said support member; a plurality of power transmitting means operatively interconnecting said source and said mechanism for simultaneous actuation of the latter; a movable control part operatively associated with said power transmitting means for progressively varying the number of said transmitting means effective to actuate said mechanism; a manually shiftable element operatively connected with said control part for moving same so as to selectively vary the number of said power transmitting means operative to effect a lifting actuation of said mechanism; additional control means operatively connecting said support member with said control part, and including a connection with said manually shiftable element rendering said additional means operative, whenever said manually shiftable element is in a position rendering less than all of said transmitting means operative to actuate said mechanism, to move said control part to increase the number of said power transmitting means effective to actuate said mechanism and thereby the rate of lift in accordance with the extent said support member moves longitudinally in said direction; and a lockout element associated with said additional means and selectively positionable to render said longitudinal movement of said support member ineffective to move said control part.

5. In combination with a tractor having a power source; a drawbar support member operatively mounted on said tractor for limited fore and aft movement longitudinally thereof; a resilient means carried by said tractor in a position resisting said movement of said support member in the direction it would normally be urged by the ground penetration of a soil working implement having a propelling connection therewith; a mechanism operatively mounted on said tractor in a position adapted for lifting a soil working implement having a propelling connection with said support member; a plurality of power transmitting means operatively interconnecting said source and said mechanism for simultaneous actuation of the latter; a movable control part operatively associated with said power transmitting means for progressively varying the number of said transmitting means effective to actuate said mechanism; a manually shiftable element operatively connected with said control part for moving same so as to selectively vary the number of said power transmitting means operative to effect a lifting actuation of said mechanism; and additional control means operatively connecting said support member with said control part and including a connection with said manually shiftable element rendering said additional means operative, whenever said manually shiftable element is in a position rendering less than all of said power transmitting means operative to actuate said mechanism, to move said control part to increase the number of said power transmitting means effective to actuate said mechanism and thereby the rate of lift in accordance with the extent said support member moves longitudinally in said direction, said manually shiftable element and said support member being connected with said control part through a common motion transmitting member movable by an actuation of said manually shiftable element to a position having a lost motion connection with said control part whereby a preselected increase in said work load is necessary before a movement of said support member effects a corresponding movement of said control part.

6. In combination with a tractor; a drawbar support member operatively mounted on said tractor for limited fore and aft movement longitudinally thereof; a resilient means carried by said tractor in a position resisting said movement of said support member in the direction it would normally be urged by the ground penetration of a soil working implement having a propelling connection therewith; a source of liquid; a hydraulic pump deriving operating power from said tractor, said hydraulic pump including a plurality of pumping elements receiving liquid from said source; a lift mechanism operatively mounted on said tractor for connection with a soil working implement having a propelling connection with said support, said mechanism including a ram unit receiving pressure liquid from said pump; a control valve positioned on the discharge side of said pump and being operatively movable to increase or decrease the number of said pumping elements delivering liquid to said ram unit; and additional control means operatively connecting said support member with said control valve and rendering the latter operative to change the number of pumping elements delivering liquid to said ram unit and thereby the rate of ram displacement in accordance with the extent said support member moves longitudinally in said direction.

7. In a tractor having a rotatable rear traction means; the combination comprising: a drawbar pivotally attached to a support member operatively mounted on said tractor for fore and aft swinging movement about a transverse pivotal axis disposed forward and below the axis of rotation of said rear traction means, said drawbar being thus supported for limited movement longitudinally of said tractor; means resisting such movement of such drawbar as may result from an increase in an implement induced work load thereon; a source of liquid; a hydraulic pump deriving operating power from said tractor, said hydraulic pump including a plurality of pumping elements receiving liquid from said source; a lift mechanism adapted for operative connection with an implement coupled with said drawbar, said mechanism including a ram unit receiving pressure liquid from said pump; a control valve movable to increase or decrease the number of said pumping elements delivering liquid to said ram unit; and additional control means operatively connecting said drawbar with said control valve and rendering the latter operative to change the number of pumping elements delivering liquid to said ram and thereby the rate of ram displacement in accordance with the extent said drawbar structure moves longitudinally in response to an increase in the implement induced work load thereon.

8. In combination with a tractor: a drawbar operatively mounted on said tractor for limited fore and aft movement longitudinally thereof; a resilient means carried by said tractor in a position resisting said movement of said drawbar in a predetermined direction; a soil working implement coupled with a rear portion of said drawbar and being thereby disposed in trailing relation behind said tractor, said implement exerting a working load on said drawbar which acts in opposition to said resilient means; a source of liquid; a hydraulic pump deriving operating power from said tractor, said hydraulic pump including a plurality of pumping elements receiving liquid from said source; a lift mechanism comprising a ram unit operatively associated with said implement to raise the soil working elements thereof relative to the ground in accordance with the rate of ram displacement; a control valve movable to increase or decrease the number of said pumping elements delivering liquid to said ram unit; and additional control means operatively connecting said drawbar with said control valve so that a longitudinal movement of said drawbar, resulting from a change in the work load exerted thereon by said implement, proportionally shifts the position of said control valve to change the number of pumping elements delivering liquid to said ram unit and thereby the rate of ram displacement.

9. In combination with a tractor having a rear traction means and an engine connected in driving relation to said traction means; a lever pivotally mounted on the tractor forward of and below the axis of rotation of said rear traction means for swinging movement longitudinally of the tractor; a drawbar pivotally connected with said lever for vertical swinging movement relative thereto, said drawbar and lever being movable in unison longitudinally of the tractor; a soil working implement connected in draft force transmitting relation to a portion of said drawbar remote from said lever; a source of liquid; a hydraulic pump deriving operating power from said tractor, said hydraulic pump including a plurality of pumping elements receiving liquid from said source; a lift mechanism mounted on said tractor and including a ram unit receiving pressure liquid from said pump, said ram unit being operatively connected with said implement to raise the latter in accordance with the rate of ram displacement; a control valve movable to increase or decrease the number of said pumping elements delivering liquid to said ram unit; and additional control means operatively connecting said drawbar with said control valve so that a longitudinal movement of said drawbar, resulting from a change in the work load exerted thereon by said implement, proportionately shifts the position of said control valve to change the number of pumping elements delivering liquid to said ram unit and thereby the rate of ram displacement.

10. In combination with a tractor having a power source and a rear traction device for propelling same; a drawbar supporting lever operatively mounted on said tractor for limited fore and aft swinging movement longitudinally thereof; soil working implements operatively mounted on said tractor for both vertical and longitudinal movement through means including propelling bars extending fore and aft from and connecting said implements with said supporting lever so as to exert an implement induced work load on the latter; a resilient means carried by said tractor in a position resisting said movement of said supporting lever in the direction it would normally be urged by the ground penetration of said soil working implements having propelling connections therewith, said implements being disposed in front and to the rear of said traction device; a source of liquid; a mechanism operatively mounted on said tractor in a position adapted for lifting said soil working implements having propelling connections with said supporting lever; a plurality of power transmitting means comprising a hydraulic pump including a plurality of pumping elements receiving liquid from said source of liquid and including a pair of ram units receiving liquid from said pump and being operative to interconnect said power source and said mechanism for simultaneous actuation of the latter; a control valve operatively associated with said power transmitting means and movable to progressively increase or decrease the number of said pumping elements effective to actuate said mechanism; and additional control means comprising a linkage operatively connecting said supporting lever and said valve so as to move the latter in response to and proportional to the extent said supporting lever moves longitudinally in said direction to thereby increase the number of pumps effective to actuate said mechanism.

11. In combination with a tractor having a power source and a rear traction means for propelling same; a drawbar supporting lever operatively mounted on said tractor for limited fore and aft swinging movement longitudinally thereof; soil working implements operatively mounted on said tractor for both vertical and longitudinal movement relative thereto through means including propelling bars extending fore and aft from and connecting said implements with said supporting lever so as to exert an implement induced work load on the latter; a resilient means comprising a biased device carried by said tractor in a position resisting said movement of said supporting lever in the direction it would normally be urged by the ground penetration of said soil working implements having propelling connections therewith, said implements being disposed in front of and to the rear of said traction means; a source of liquid; a mechanism operatively mounted on said tractor in a position adapted for lifting said soil working implements having propelling connections with said supporting lever; a plurality of power transmitting means comprising a hydraulic pump including a plurality of pumping elements receiving liquid from said source of liquid and including a pair of ram units receiving liquid from said pump and being operative to interconnect said power source and said mechanism for simultaneous actuation of the latter; a control valve disposed on the discharge side of said pump and being movable to progressively increase and decrease the number of said pumping elements effective to actuate said mechanism; a manually shiftable element operative to controllably move and retain said control valve in a preselected position; and additional control means comprising a linkage operatively interconnecting said supporting lever, said manually shiftable element and said control valve for moving said control valve away from said preselected position and relative to said manually shiftable element in accordance with the extent said supporting lever moves longitudinally in said direction.

12. In combination with a tractor having a power source comprising an engine and a rear traction means connected in driven relation with said engine; soil working implements operatively mounted on said tractor to the front and to the rear of said traction means for independent movement both vertically and longitudinally relative to said tractor; a drawbar supporting lever pivotally mounted on said tractor for limited fore and aft swinging movement longitudinally thereof; implement propelling bars extending fore and aft from and operatively connecting said implements with said supporting lever so as to exert an implement induced work load on the latter; a resilient means comprising a biased device carried by said tractor in a position resisting said movement in the direction it would normally be urged by the ground penetration of said soil working implements having propelling connections therewith; a source of liquid; separate lift mechanisms operatively mounted on said tractor and connected with said soil working implements for individually raising and lowering same; a plurality of power transmitting means comprising a hydraulic pump deriving operating power from said engine and including a plurality of pumping elements receiving liquid from said source of liquid and including a pair of ram units receiving liquid from said pump and being operative to interconnect said power source and said lift mechanisms for simultaneous actuation of the latter; said ram units being pivotally supported on said tractor for vertical swinging movement about transverse pivot axes with one of said axes disposed approximately midway between longitudinally aligned and spaced parts of said separate lift mechanisms whereby one of said ram units is selectively connectable with either of said mechanisms; a control valve operatively associated with said power transmitting means and selectively positionable for progressively varying the number of pumping elements delivering pressure liquid to said ram units to thereby vary the rate of ram displacement; and additional control means comprising a linkage operatively connecting said support lever and said control valve so that a work load induced movement of the former actuates said valve to increase the number of pumping elements delivering liquid to said ram units in accordance with the extent said supporting lever moves longitudinally in response to an increase in the work load exerted thereon by said implements.

References Cited in the file of this patent

UNITED STATES PATENTS

| Number | Name | Date |
|---|---|---|
| 1,279,792 | Ulevog | Sept. 24, 1918 |
| 2,074,618 | Roeder | Mar. 23, 1937 |
| 2,103,530 | Henry | Dec. 28, 1937 |
| 2,356,231 | Ferguson | Aug. 22, 1944 |
| 2,368,125 | Evans | Jan. 30, 1945 |
| 2,394,210 | Sherman | Feb. 5, 1946 |
| 2,405,334 | Silver | Aug. 6, 1946 |
| 2,412,362 | Silver | Dec. 10, 1946 |
| 2,430,597 | Acton | Nov. 11, 1947 |
| 2,611,306 | Strehlow et al. | Sept. 23, 1952 |
| 2,611,307 | Strehlow et al. | Sept. 23, 1952 |

FOREIGN PATENTS

| Number | Country | Date |
|---|---|---|
| 253,566 | Great Britain | June 14, 1926 |